US008833446B2

(12) United States Patent
Lively et al.

(10) Patent No.: US 8,833,446 B2
(45) Date of Patent: Sep. 16, 2014

(54) COMPOSITE BOW CENTRALIZER

(75) Inventors: Glenn Lively, The Woodlands, TX (US);
David Levie, Kastanienbaum (CH);
Dietmar Mueller, Herford (DE);
Thorsten Weber, Frankfurt am Main (DE)

(73) Assignee: Halliburton Energy Services, Inc., Duncan, OK (US)

( * ) Notice: Subject to any disclaimer, the term of this patent is extended or adjusted under 35 U.S.C. 154(b) by 279 days.

(21) Appl. No.: 13/013,259

(22) Filed: Jan. 25, 2011

(65) Prior Publication Data

US 2012/0186808 A1 Jul. 26, 2012

(51) Int. Cl.
*E21B 17/10* (2006.01)
*E21B 23/00* (2006.01)

(52) U.S. Cl.
CPC ......... *E21B 17/1028* (2013.01); *E21B 17/1085* (2013.01); *E21B 17/1078* (2013.01)
USPC ...................... 166/241.6; 166/213; 175/325.5

(58) Field of Classification Search
CPC . E21B 17/1078; E21B 17/10; E21B 17/1042; E21B 17/1014; E21B 17/1085
USPC ...................... 166/241.6, 213, 172, 381, 380; 175/325.5
See application file for complete search history.

(56) References Cited

U.S. PATENT DOCUMENTS

| | | | |
|---|---|---|---|
| 2,220,237 A * | 11/1940 | Hall ............................. | 166/172 |
| 2,228,649 A * | 1/1941 | Welles .......................... | 166/172 |
| 2,482,985 A * | 9/1949 | Lockwood .................... | 166/173 |
| 2,904,313 A | 9/1959 | Wisenbaker | |
| 2,998,074 A * | 8/1961 | Casady et al. ................ | 166/172 |
| 3,177,946 A * | 4/1965 | Hall, Sr. ..................... | 166/241.7 |
| 3,209,836 A | 10/1965 | Hall, Sr. | |
| 3,343,608 A | 9/1967 | Solum | |
| 3,566,965 A | 3/1971 | Solum | |

(Continued)

FOREIGN PATENT DOCUMENTS

| | | |
|---|---|---|
| CN | 1837572 A | 9/2006 |
| CN | 100404784 C | 7/2008 |

(Continued)

OTHER PUBLICATIONS

Patent application entitled "Improved Limit Collar," by William Iain Elder Levie, filed Apr. 25, 2011 as U.S. Appl. No. 13/093,242.

(Continued)

*Primary Examiner* — Kenneth L Thompson
*Assistant Examiner* — Michael Wills, III
(74) *Attorney, Agent, or Firm* — John Wustenberg; Conley Rose, P.C.

(57) ABSTRACT

A centralizer comprises a first collar, a second collar, a plurality of bow springs coupling the first collar to the second collar, and a plurality of particulates disposed on an outer surface of at least one bow spring. One or more of the first collar, the second collar, and the bow springs comprises a composite material. In some embodiments, the centralizer comprises a third collar, wherein the plurality of bow springs comprise a first portion of bow springs and a second portion of bow springs, and wherein the first portion of the bow springs couple the first collar to the third collar and the second portion of the bow springs couple the second collar to the third collar.

20 Claims, 5 Drawing Sheets

(56) References Cited

U.S. PATENT DOCUMENTS

| | | | |
|---|---|---|---|
| 3,852,923 A * | 12/1974 | Hess | 451/484 |
| 4,467,879 A | 8/1984 | Burge | |
| 4,512,425 A | 4/1985 | Brock | |
| 4,785,852 A | 11/1988 | Okahashi et al. | |
| 4,794,986 A | 1/1989 | Langer | |
| 5,027,914 A | 7/1991 | Wilson | |
| 5,097,905 A * | 3/1992 | Goodwin | 166/378 |
| 5,228,509 A | 7/1993 | Ungemach et al. | |
| 5,358,039 A * | 10/1994 | Fordham | 166/241.1 |
| 5,575,333 A | 11/1996 | Lirette et al. | |
| 5,657,820 A | 8/1997 | Bailey et al. | |
| 5,937,948 A | 8/1999 | Robbins, III | |
| 5,988,276 A * | 11/1999 | Oneal | 166/118 |
| 6,062,326 A | 5/2000 | Strong et al. | |
| 6,065,537 A | 5/2000 | Evans et al. | |
| 6,102,118 A | 8/2000 | Moore | |
| 6,209,638 B1 | 4/2001 | Mikolajczyk | |
| 6,285,014 B1 | 9/2001 | Beck et al. | |
| 6,371,203 B2 * | 4/2002 | Frank et al. | 166/207 |
| 6,401,820 B1 | 6/2002 | Kirk et al. | |
| 6,457,517 B1 | 10/2002 | Goodson et al. | |
| 6,637,511 B2 * | 10/2003 | Linaker | 166/241.7 |
| 6,659,173 B2 | 12/2003 | Kirk et al. | |
| 6,679,325 B2 | 1/2004 | Buytaert | |
| 6,830,102 B2 * | 12/2004 | Kirk et al. | 166/241.6 |
| 6,997,254 B2 | 2/2006 | Jenner | |
| 7,231,975 B2 | 6/2007 | Lavaure et al. | |
| 7,412,761 B2 | 8/2008 | Male et al. | |
| 7,748,476 B2 * | 7/2010 | Krueger, V | 175/99 |
| 7,845,061 B2 | 12/2010 | Buytaert et al. | |
| 7,861,744 B2 | 1/2011 | Fly et al. | |
| 8,162,050 B2 | 4/2012 | Roddy et al. | |
| 8,196,670 B2 | 6/2012 | Jenner | |
| 8,220,563 B2 | 7/2012 | Bangaru et al. | |
| 8,245,777 B2 * | 8/2012 | Garner | 166/213 |
| 8,281,857 B2 | 10/2012 | Willberg et al. | |
| 8,291,975 B2 | 10/2012 | Roddy et al. | |
| 8,297,352 B2 | 10/2012 | Roddy et al. | |
| 8,297,353 B2 | 10/2012 | Roddy et al. | |
| 8,302,686 B2 | 11/2012 | Roddy et al. | |
| 8,316,936 B2 | 11/2012 | Roddy et al. | |
| 8,360,161 B2 | 1/2013 | Buytaert et al. | |
| 2001/0037883 A1 | 11/2001 | Veneruso et al. | |
| 2002/0139537 A1 * | 10/2002 | Young et al. | 166/378 |
| 2002/0139538 A1 * | 10/2002 | Young et al. | 166/380 |
| 2005/0224123 A1 | 10/2005 | Baynham et al. | |
| 2007/0131414 A1 | 6/2007 | Calderoni et al. | |
| 2007/0181298 A1 * | 8/2007 | Sheiretov et al. | 166/212 |
| 2008/0035331 A1 | 2/2008 | Buytaert | |
| 2008/0196900 A1 | 8/2008 | Leibfried et al. | |
| 2008/0283236 A1 | 11/2008 | Akers et al. | |
| 2009/0308615 A1 * | 12/2009 | Buytaert | 166/378 |
| 2010/0044110 A1 * | 2/2010 | Bangru et al. | 175/61 |
| 2010/0218956 A1 | 9/2010 | Buytaert et al. | |
| 2010/0243257 A1 * | 9/2010 | Krieg et al. | 166/311 |
| 2010/0252274 A1 | 10/2010 | Buytaert et al. | |
| 2011/0042102 A1 * | 2/2011 | Buytaert | 166/380 |
| 2011/0146971 A1 | 6/2011 | Buytaert et al. | |
| 2011/0187556 A1 | 8/2011 | Roddy et al. | |
| 2011/0199228 A1 | 8/2011 | Roddy et al. | |
| 2012/0145410 A1 | 6/2012 | Levie | |
| 2012/0145414 A1 | 6/2012 | Nutley et al. | |
| 2012/0186808 A1 | 7/2012 | Lively et al. | |
| 2012/0186828 A1 | 7/2012 | Lively et al. | |
| 2012/0267121 A1 | 10/2012 | Levie | |
| 2013/0068483 A1 | 3/2013 | Levie et al. | |

FOREIGN PATENT DOCUMENTS

| | | | |
|---|---|---|---|
| DE | 102005040482 A1 | 3/2007 | |
| EP | 1235971 B1 | 11/2005 | |
| GB | 2272925 A | 6/1994 | |
| GB | 2431664 A | 5/2007 | |
| JP | 60166516 A | 8/1985 | |
| WO | 0066874 A1 | 11/2000 | |
| WO | 0146550 A1 | 6/2001 | |
| WO | 0202904 A1 | 1/2002 | |
| WO | 0248501 A1 | 6/2002 | |
| WO | 2004015238 A1 | 2/2004 | |
| WO | 2007143324 A1 | 12/2007 | |
| WO | 2008015402 A2 | 2/2008 | |
| WO | 2008144249 A2 | 11/2008 | |
| WO | 2011025488 A1 | 3/2011 | |
| WO | 2012076850 A1 | 6/2012 | |
| WO | 2012076850 A8 | 6/2012 | |
| WO | 2012101401 A2 | 8/2012 | |
| WO | 2012101401 A3 | 8/2012 | |
| WO | 2012101402 A2 | 8/2012 | |
| WO | 2012101402 A3 | 8/2012 | |
| WO | 2012146892 A2 | 11/2012 | |
| WO | 2012146892 A3 | 11/2012 | |
| WO | 2013043392 A2 | 3/2013 | |

OTHER PUBLICATIONS

Patent application entitled "Composite Stop Collar," by William Iain Elder Levie, filed Sep. 20, 2011 as U.S. Appl. No. 13/236,987.

Foreign communication from a related counterpart application—International Search Report, PCT/GB2011/001704, May 15, 2012, 5 pages.

Foreign communication from a related counterpart application—International Search Report and Written Opinion, PCT/GB2012/000066, Nov. 22, 2012, 10 pages.

Foreign communication from a related counterpart application—International Search Report and Written Opinion, PCT/GB2012/000067, Nov. 23, 2012, 11 pages.

Office Action dated Feb. 14, 2013 (31 pages), U.S. Appl. No. 12/964,605, filed Dec. 9, 2010.

Foreign communication from a related counterpart application—International Search Report and Written Opinion, PCT/US2009/055193, May 25, 2010, 10 pages.

Patent application entitled "Integral pull-through centralizer," by Iain Levie, filed Dec. 9, 2010 as U.S. Appl. No. 12/964,605.

Patent application entitled "Composite bow centralizer," by Glenn Lively, et al., filed Jan. 25, 2011 as U.S. Appl. No. 13/013,266.

"Specifications for bow-spring centralizers," API Specification 10D, Mar. 2002, 6th edition, 24 pages, American Petroleum Institute, Washington, D.C.

Foreign communication from a related counterpart application—International Search Report and Written Opinion, PCT/GB2012/000382, Aug. 9, 2013, 10 pages.

Notice of Allowance dated May 23, 2013 (15 pages), U.S. Appl. No. 12/964,605, filed Dec. 9, 2010.

Notice of Allowance dated Sep. 3, 2013 (14 pages), U.S. Appl. No. 13/093,242, filed Apr. 25, 2011.

Office Action (Final) dated Jul. 19, 2013 (19 pages), U.S. Appl. No. 13/013,266, filed Jan. 25, 2011.

Office Action dated Apr. 1, 2013 (33 pages), U.S. Appl. No. 13/013,266, filed Jan. 25, 2011.

Foreign communication from a related counterpart application—International Preliminary Report on Patentability, PCT/US2009/055193, Feb. 28, 2012, 5 pages.

Office Action dated Apr. 26, 2013 (25 pages), U.S. Appl. No. 13/093,242, filed Apr. 25, 2011.

Office Action dated Oct. 18, 2013 (13 pages), U.S. Appl. No. 13/013,266, filed Jan. 25, 2011.

Foreign communication from a related counterpart application—International Preliminary Report on Patentability, PCT/GB2011/001704, Jun. 12, 2013, 9 pages.

Foreign communication from a related counterpart application—International Preliminary Report on Patentability, PCT/GB2012/000066, Jul. 30, 2013, 6 pages.

(56) References Cited

OTHER PUBLICATIONS

Foreign communication from a related counterpart application—International Preliminary Report on Patentability, PCT/GB2012/000067, Jul. 30, 2013, 6 pages.

Foreign communication from a related counterpart application—International Preliminary Report on Patentability, PCT/GB2012/000382, Oct. 29, 2013, 6 pages.

Foreign communication from a related counterpart application—International Search Report and Written Opinion, PCT/US2012/054153, Feb. 24, 2014, 10 pages.

\* cited by examiner

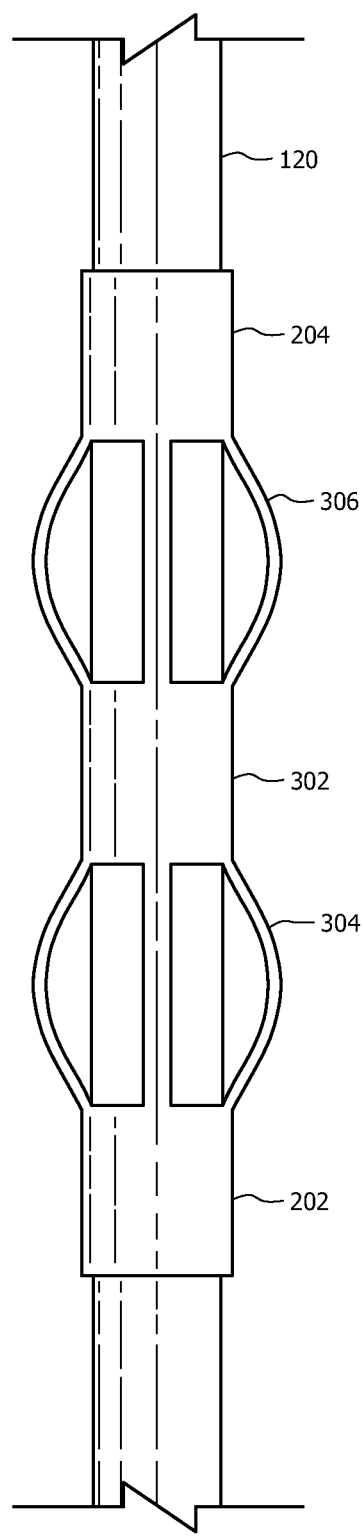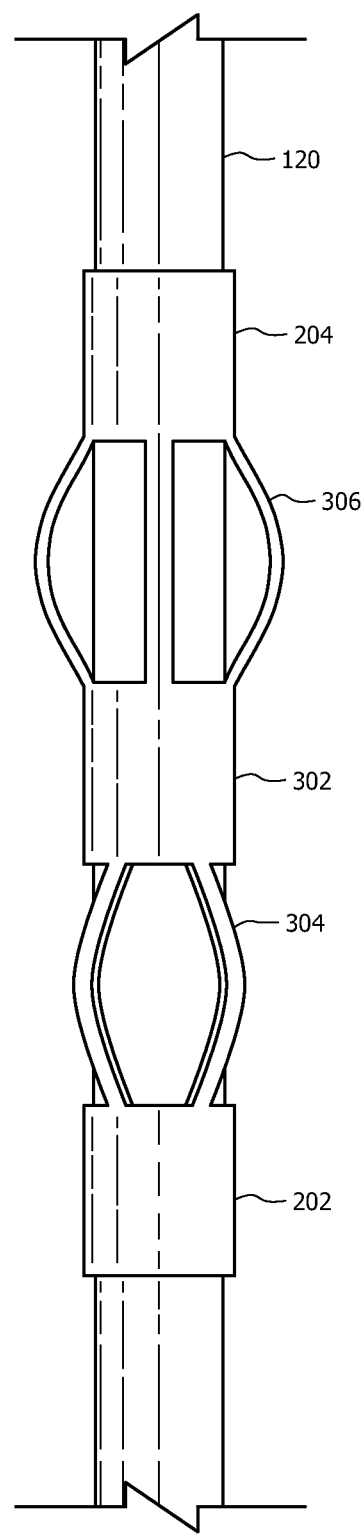
*FIG. 3A*     *FIG. 3B*

COMPOSITE BOW CENTRALIZER

CROSS-REFERENCE TO RELATED APPLICATIONS

This application is related to commonly owned U.S. patent application Ser. No. 13/013,266, entitled "Composite Bow Centralizer," filed on Jan. 25, 2011 and incorporated by reference herein.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wellbores are sometimes drilled into subterranean formations that contain hydrocarbons to allow recovery of the hydrocarbons. Some wellbore servicing methods employ wellbore tubulars that are lowered into the wellbore for various purposes throughout the life of the wellbore. Since wellbores are not generally perfectly vertical, centralizers are used to maintain the wellbore tubulars aligned within the wellbore. Alignment may help prevent any friction between the wellbore tubular and the side of the wellbore wall or casing, potentially reducing any damage that may occur. Common spring centralizers use stop collars located at either end of the centralizer to maintain the centralizer position relative to the wellbore tubular as the tubular is conveyed into and out of the wellbore. The spring centralizer may be free to move within the limits of the stop collars. The spring centralizers and the stop collars are made of metals, such as steel, to provide suitable properties for the centralizer.

SUMMARY

In an embodiment, a centralizer comprises a first collar; a second collar; a plurality of bow springs coupling the first collar to the second collar; and a plurality of particulates disposed on an outer surface of at least one bow spring; wherein one or more of the first collar, the second collar, and the bow springs comprise a composite material. The leading or trailing edges of the first collar or the second collar may be tapered or angled. The centralizer may further comprise a third collar, wherein the plurality of bow springs comprise a first portion of bow springs and a second portion of bow springs, and wherein the first portion of the bow springs couple the first collar to the third collar and the second portion of the bow springs couple the second collar to the third collar. At least one of the plurality of bow springs may have a multi-step design comprising a plurality of arced sections. The thickness of at least one bow spring may vary along the length of the bow spring. The particulates may comprise substantially spherical particles, and may have a size ranging from about 0.001 inches to about 0.2 inches. The particulates comprise a metal or ceramic, and the particulates comprise zirconium oxide. The particulates may be coated with a surface coating agent. The composite material may comprise a fiber and a matrix material. The matrix material may comprise a resin comprising a hardenable resin and a hardening agent. The fiber may comprise a glass fiber, a cellulosic fiber, a carbon fiber, a graphite fiber, a metal fiber, a ceramic fiber, a metallic-ceramic fiber, an aramid fiber, or any combination thereof, and the fiber may coated with a surface coating agent.

In another embodiment, a centralizer comprises three or more collars; a plurality of bow springs comprising a plurality of portions of bow springs, wherein each portion of bow springs couples two adjacent collars, and wherein one or more of the collars and the bow springs comprise a composite material. The bow springs in adjacent portions may be longitudinally aligned in an offset pattern. The number of bow springs in a first portion and a second portion may be different. The centralizer may further comprise a plurality of particulates disposed along the outer surface of at least one bow spring. The composite material may comprise a fiber and a matrix material. The matrix material may comprise a resin comprising a hardenable resin and a hardening agent. The fiber may comprise a glass fiber, a cellulosic fiber, a carbon fiber, a graphite fiber, a metal fiber, a ceramic fiber, a metallic-ceramic fiber, an aramid fiber, or any combination thereof. The fiber may be coated with a surface coating agent.

In an embodiment, a method comprises providing a centralizer disposed about a wellbore tubular, wherein the centralizer comprises: a first collar; a second collar; a plurality of bow springs coupling the first collar to the second collar; and a plurality of particulates disposed on an outer surface of at least one bow spring; wherein one or more of the first collar, the second collar, and the bow springs comprise a composite material; and placing the wellbore tubular in a wellbore disposed in a subterranean formation. At least one bow springs may have a multi-step design comprising a plurality of arced sections. The particulates may comprise substantially spherical particles, and the particulates may comprise zirconium oxide. The particulates may be coated with a surface coating agent. The centralizer may be maintained in position on the wellbore tubular using stop collars, protrusions, upsets, or any combination thereof. The centralizer may rotate about the wellbore tubular. The composite material may comprise a fiber and a matrix material, and the matrix material may comprise a resin comprising at least one component selected from the group consisting of: an orthophthalic polyester, an isophthalic polyester, a phthalic/maelic type polyester, a vinyl ester, a thermosetting epoxy, a phenolic, a cyanate, a bismaleimide, a nadic end-capped polyimide, a polysulfone, a polyamide, a polycarbonate, a polyphenylene oxide, a polysulfide, a polyether ether ketone, a polyether sulfone, a polyamide-imide, a polyetherimide, a polyimide, a polyarylate, a liquid crystalline polyester, a polyurethane, a polyurea, and any combinations thereof. The matrix material may comprise a resin comprising a hardenable resin and a hardening agent. The hardenable resin may comprise at least one component selected from the group consisting of: a bisphenol A diglycidyl ether resin, a butoxymethyl butyl glycidyl ether resin, a bisphenol A-epichlorohydrin resin, a bisphenol F resin, a polyepoxide resin, a novolak resin, a polyester resin, a phenol-aldehyde resin, a urea-aldehyde resin, a furan resin, a urethane resin, a glycidyl ether resin, and any combinations thereof. The hardening agent may comprise at least one component selected from the group consisting of: a cyclo-aliphatic amine, an aromatic amine, an aliphatic amine, an imidazole, a pyrazole, a pyrazine, a pyrimidine, a pyridazine, a 1H-indazole, a purine, a phthalazine, a naphthyridine, a quinoxaline, a quinazoline, a phenazine, an imidazolidine, a cinnoline, an imidazoline, a 1,3,5-triazine, a thiazole, a pteridine, an indazole, an amine, a polyamine, an amide, a polyamide, a 2-ethyl-4-methyl imidazole, and any combinations thereof. The fiber may coated with a surface coating agent, and the surface coating agent may comprise at least one compound selected from the group consisting of: a silazane, a siloxane, an alkoxysilane, an aminosilane, a silane, a silanol, a polyvinyl alcohol, and any combination thereof.

In still another embodiment, a method comprises providing a centralizer disposed about a wellbore tubular, wherein the wellbore tubular comprises a stop collar, a protrusion, or an upset on either end of the centralizer, and wherein the centralizer comprises: three or more collars; a plurality of bow springs comprising a plurality of portions of bow springs, wherein each portion of bow springs couples two adjacent collars, and wherein one or more of the collars and the bow springs comprise a composite material; and placing the wellbore tubular in a wellbore disposed in a subterranean formation. The bow springs in at least two adjacent portions may be longitudinally aligned in an offset pattern. The method may further comprises a plurality of particulates disposed along an outer surface of at least one bow spring. The composite material may comprise a fiber and a matrix material. The matrix material may comprise a resin comprising a hardenable resin and a hardening agent. The fiber may be coated with a surface coating agent, and the surface coating agent may comprise at least one compound selected from the group consisting of: a silazane, a siloxane, an alkoxysilane, an aminosilane, a silane, a silanol, a polyvinyl alcohol, and any combination thereof.

In an embodiment, a centralizer is produced from a process comprising: forming a plurality of composite bow spring from a fiber and a resin; disposing a plurality of particulates on an outer surface of the composite bow springs; curing the composite bow springs in a desired shape to form a plurality of cured bow springs; disposing a first portion of a resin-wetted fiber about a cylindrical mandrel to form a plurality of collars; disposing the plurality of cured bow springs onto the mandrel with the bow spring ends in contact with the first portion of resin-wetted fiber; disposing a second portion of the resin-wetted fiber about the cylindrical mandrel; curing the collars to form a cured centralizer; and pressing the mandrel out of the cured centralizer. The fiber may be supplied as a filament, a yarn, a tow, a roving, a tape, a fabric, or any combination thereof. The fiber in the composite bow spring may be aligned in a longitudinal direction, and the fiber in the collars may be aligned in a circumferential direction. The process may comprise an automated process, and the automated process may consider a diameter of the fiber, a stiffness of the fiber, a moduli of the fiber, a cost of the fiber, or any combination thereof.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description:

FIGS. 3A and 3B are plan views of centralizers according to embodiments.

DETAILED DESCRIPTION OF THE EMBODIMENTS

Figure 1:
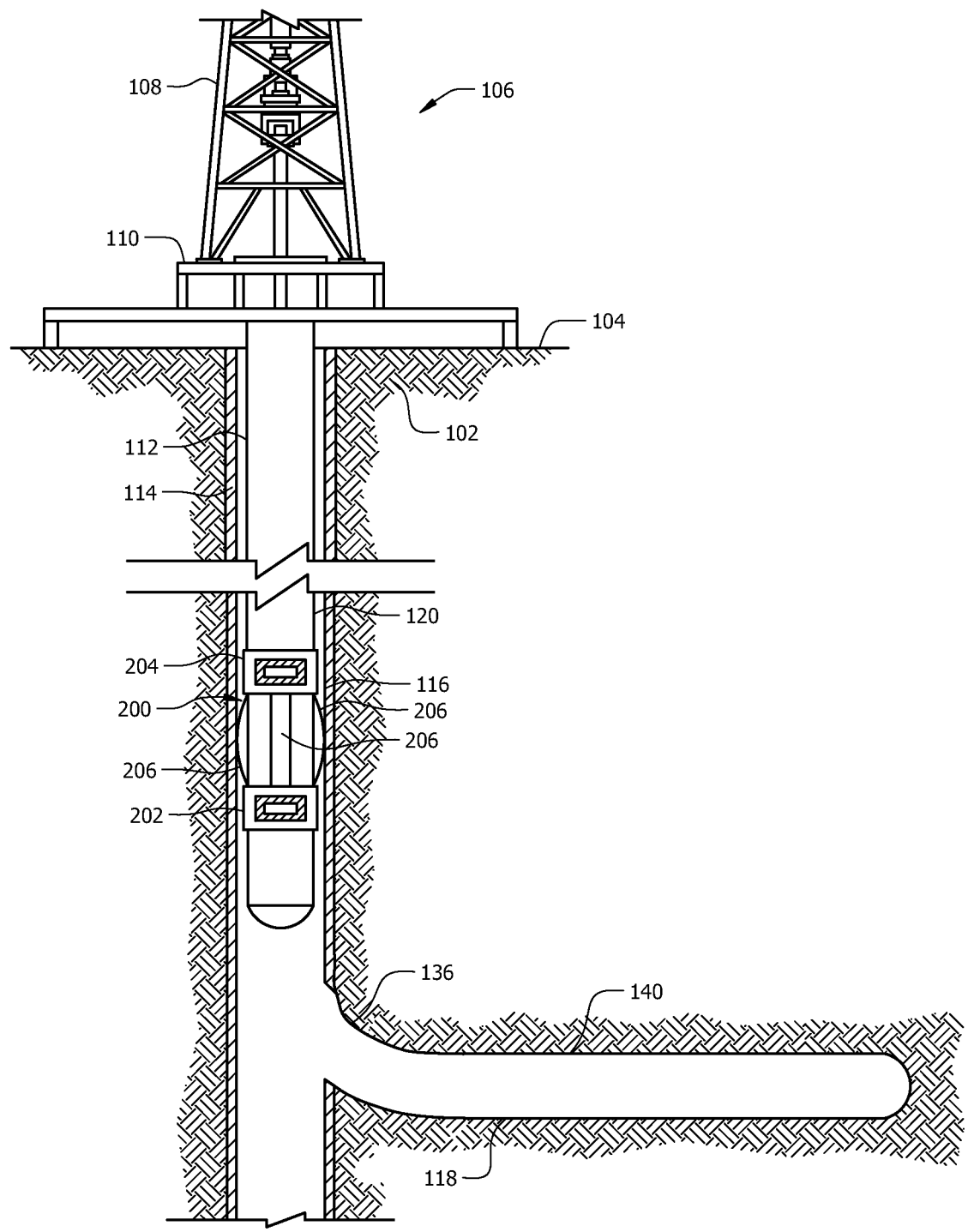
FIG. 1 is a cut-away view of an embodiment of a wellbore servicing system according to an embodiment.

In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," or "upstream" meaning toward the surface of the wellbore and with "down," "lower," "downward," or "downstream" meaning toward the terminal end of the well, regardless of the wellbore orientation. The various characteristics mentioned above, as well as other features and characteristics described in more detail below, will be readily apparent to those skilled in the art with the aid of this disclosure upon reading the following detailed description of the embodiments, and by referring to the accompanying drawings.

Disclosed herein is a centralizer for use with a wellbore tubular. The centralizer may comprise one or more composite materials. The resulting centralizer may be relatively light weight as compared to a traditional metallic centralizer, representing an operational safety advantage. The use of composite materials may allow for an easier and faster removal of the centralizer and/or any centralizer components from the wellbore should a centralizer fail within the wellbore as compared to metallic centralizers and/or metallic centralizer components. Further, the composite materials may allow for the use of the centralizers in magnetically sensitive applications (e.g., measurement while drilling subs, surveying, etc.). In addition, the ability to form the centralizers from a composite material may allow the centralizer to be quickly manufactured and tailored to a particular application, which may allow a centralizer to be optimized for a given use based on the conditions in a specific wellbore. Further, the ability to use various materials of construction such as various fibers, resins, and/or particulates may allow for a flexible design, cost effectiveness, and geometry previously unavailable with traditional metallic centralizers.

Referring to FIG. 1, an example of a wellbore operating environment is shown. As depicted, the operating environment comprises a drilling rig 106 that is positioned on the earth's surface 104 and extends over and around a wellbore 114 that penetrates a subterranean formation 102 for the purpose of recovering hydrocarbons. The wellbore 114 may be drilled into the subterranean formation 102 using any suitable drilling technique. The wellbore 114 extends substantially vertically away from the earth's surface 104 over a vertical wellbore portion 116, deviates from vertical relative to the earth's surface 104 over a deviated wellbore portion 136, and transitions to a horizontal wellbore portion 118. In alternative operating environments, all or portions of a wellbore may be vertical, deviated at any suitable angle, horizontal, and/or curved. The wellbore may be a new wellbore, an existing wellbore, a straight wellbore, an extended reach wellbore, a sidetracked wellbore, a multi-lateral wellbore, and other types of wellbore for drilling and completing one or more production zones. Further the wellbore may be used for both producing wells and injection wells. In an embodiment, the wellbore may be used for purposes other than or in addition to hydrocarbon production, such as uses related to geothermal energy.

A wellbore tubular string 120 comprising a centralizer 200 may be lowered into the subterranean formation 102 for a variety of drilling, completion, workover, or treatment procedures throughout the life of the wellbore. The embodiment shown in FIG. 1 illustrates the wellbore tubular 120 in the form of a casing string being lowered into the subterranean formation. It should be understood that the wellbore tubular 120 comprising a centralizer 200 is equally applicable to any type of wellbore tubular being inserted into a wellbore, including as non-limiting examples liners, drill pipe, production tubing, rod strings, and coiled tubing. The centralizer 200 may also be used to centralize various subs and workover tools. In the embodiment shown in FIG. 1, the wellbore tubular 120 comprising centralizer 200 is conveyed into the subterranean formation 102 in a conventional manner and may subsequently be secured within the wellbore 114 by filling an annulus 112 between the wellbore tubular 120 and the wellbore 114 with a cementitous material.

The drilling rig 106 comprises a derrick 108 with a rig floor 110 through which the wellbore tubular 120 extends downward from the drilling rig 106 into the wellbore 114. The drilling rig 106 comprises a motor driven winch and other associated equipment for extending the casing string 120 into the wellbore 114 to position the wellbore tubular 120 at a selected depth. While the operating environment depicted in FIG. 1 refers to a stationary drilling rig 106 for lowering and setting the wellbore tubular 120 comprising the centralizer 200 within a land-based wellbore 114, in alternative embodiments, mobile workover rigs, wellbore servicing units (such as coiled tubing units), and the like may be used to lower the wellbore tubular 120 comprising the centralizer 200 into a wellbore. It should be understood that a wellbore tubular 120 comprising the centralizer 200 may alternatively be used in other operational environments, such as within an offshore wellbore operational environment.

In alternative operating environments, a vertical, deviated, or horizontal wellbore portion may be cased and cemented and/or portions of the wellbore may be uncased. For example, uncased section 140 may comprise a section of the wellbore 114 ready for being cased with wellbore tubular 120. In an embodiment, the centralizer may be disposed on production tubing in a cased or uncased well. In an embodiment, a portion of the wellbore 114 may comprise an underreamed section. As used herein, underreaming refers to the enlargement of an existing wellbore below an existing section, which may be cased in some embodiments. An underreamed section may have a larger diameter than a section upward from the underreamed section. Thus, a wellbore tubular passing down through the wellbore may pass through a smaller diameter passage followed by a larger diameter passage.

Regardless of the type of operational environment the centralizer 200 is used, it will be appreciated that the centralizer 200 serves to aid in guiding and placing the wellbore tubular 120 through the wellbore 114. As described in greater detail below, the centralizer 200 comprises collars 202, 204, and a plurality of bow springs 206 connecting the collars 202, 204. The centralizer serves to center the wellbore tubular (e.g., casing string 120) within the wellbore 114 as the wellbore tubular 120 is conveyed within the wellbore 114.

Several forces are used to characterize centralizers 200. The bow springs 206 provide a force known as a "restoring force" to radially (i.e., laterally) urge the wellbore tubular away from the wall of the wellbore. At the same time, the bow springs 206 may be laterally compressible so that the wellbore tubular may be moved along the interior of the wellbore notwithstanding the presence in the wellbore of small diameter restrictions and other obstacles to longitudinal movement of the wellbore tubular within the wellbore. Upon encountering a restriction within the wellbore during conveyance, the bow springs may be compressed in order to enter the restriction. The force required to compress the bow springs and insert the centralizer into the interior of the restriction, which may include the initial insertion into the wellbore, is referred to as the "starting force." The contact between the bow springs and the wall of the wellbore may lead to a drag force. The force required to overcome the drag force may be referred to as the "running force," which is the amount of force required to move the wellbore tubular longitudinally along the wellbore with the centralizer affixed to its exterior. Specifications for the amount of restoring force and proper use of centralizers are described in a document entitled, *Specifications for Bow-Spring Centralizers*, API Specification 10D, 5th edition, American Petroleum Institute, Washington, D.C. (1994), which is incorporated herein by reference in its entirety. Generally speaking, casing centralizers are made to center a particular outside diameter (OD) wellbore tubular within a particular nominal diameter wellbore or outer wellbore tubular (e.g., a casing).

Figure 2:
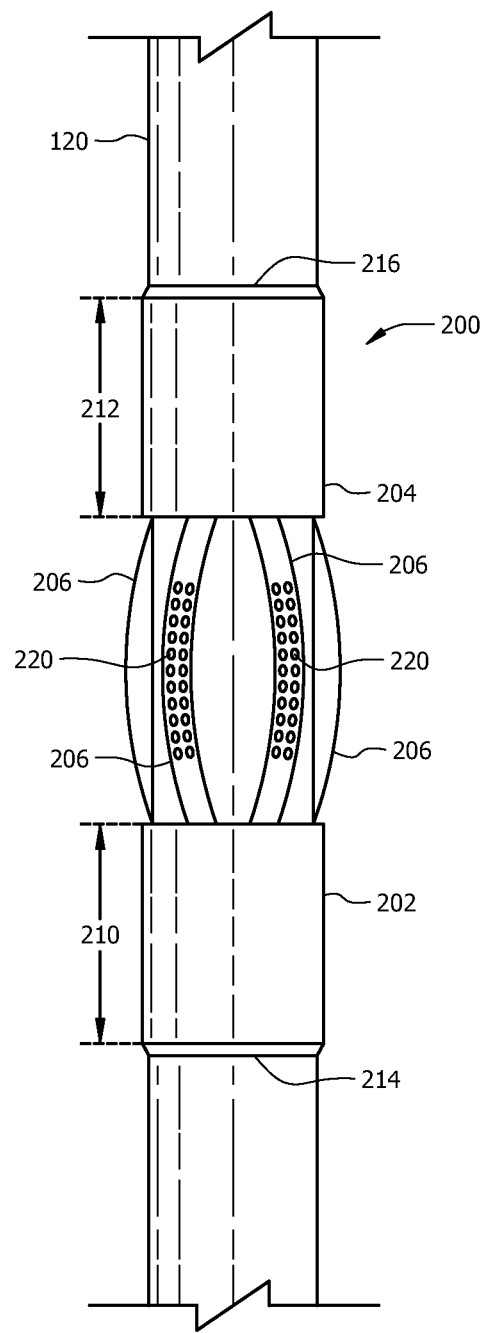
FIG. 2 is a plan view of a centralizer according to an embodiment.

Referring now to FIG. 2, an embodiment of the centralizer 200 is shown in greater detail. As described above, the centralizer 200 comprises first collar 202, second collar 204, and a plurality of bow springs 206 connecting the collars 202, 204. The collars 202, 204 and the plurality of bow springs 206 may be formed from steel, a composite, or any other similar high strength material. In an embodiment, the collars 202, 204, and/or the bow springs 206 may be made from a composite material. The collars 202, 204 may be generally cylindrical in shape and may have an internal diameter selected to be disposed about the exterior of a wellbore tubular to which they are to be coupled. The collars 202, 204 may have a desired length 210, 212 based on the mechanical requirements of the of the centralizer 200 and taking into account the material of construction and the length necessary to integrate the bow springs 206, as described in more detail below. As used herein, the length of the centralizer and/or one or more bow springs refers to the dimension of the centralizer 200 in the longitudinal direction of the wellbore tubular 120, and the width of the centralizer 200 and/or one or more bow springs 206 refers to the dimension in a direction perpendicular to the longitudinal direction of the wellbore tubular 120 along the surface of the wellbore tubular 120. In an embodiment the length 210 of the first collar 202 and the length 212 of the second collar 204 may be the same or different. The leading and/or trailing edges 214, 216 of the first collar 202 and/or the second collar 204 may be tapered or angled to aid in movement of the centralizer 200 through the wellbore (e.g., through a restriction and/or upon entering the wellbore). In an embodiment, when stop collars are used to maintain the centralizer 200 in position on the wellbore tubular, the leading and/or trailing edges of the stop collars may be tapered and the leading and/or trailing edges 214, 216 may not be tapered.

In an embodiment shown in FIG. 3A, a multi-section centralizer design is shown with a third collar 302 disposed between the first collar 202 and the second collar 204. A first portion 304 of a plurality of bow springs may be used to couple the first collar 202 and the third collar 302, and a second portion 306 of the plurality of bow springs may be used to couple the third collar 502 and the second collar 204. The third collar 302 may be similar in design to the collars 202, 204. The collars 202, 204, 302 and any of the bow spring portions 304, 306 may be formed from steel, a composite, or any other similar high strength material. In an embodiment, one or more of the first collar 202, the second collar 204, the third collar 302, the first portion 304 of the plurality of bow springs, and the second portion 306 of the plurality of bow springs may comprise a composite material. The first portion 304 of the bow springs and the second portion 306 of the bow springs may be coupled to the third collar 302 using any of the means disclosed herein. As shown in FIG. 3A, the number of bow springs in the first portion 304 and the second portion 306 of bow springs may be the same, and the bow springs in each portion may be aligned along the longitudinal axis of the wellbore tubular. In another embodiment as shown in FIG. 3B, the number of bow springs in the first portion 306 and the second portion 304 of bow springs may be the same, and the bow springs in each portion may be offset so that the bow springs do not align along the longitudinal axis of the wellbore tubular 120. In another embodiment, the number of bow springs in the first portion and the second portion of bow springs may be different, and the bow springs in each portion may be offset so that the bow springs do not align. For example, the first portion may have 5 bow springs and the second portion may have 3 bow springs. In this example, the bow springs in the first portion and the second portion may be aligned so that none of the bow springs in the first portion align along the longitudinal axis of the wellbore tubular 120 with any of the bow springs in the second portion. In an embodiment, the use of multiple collars to allow for additional bow springs between the first collar 202 and the second collar 204 may increase the restoring force without a corresponding increase in the starting force, allowing for the desired properties to be tailored based on the design of the centralizer 200. As a further advantage, a design in which the bow springs in each portion are arranged in a longitudinally offset alignment may allow for the restoring force to be increased without an increase in the starting force.

It will be appreciated that while a third collar 302 is illustrated, any number of additional collars may be disposed between subsequent portions of the bow springs to connect the first collar 202 to the second collar 204. In an embodiment, a plurality of collars may be coupled by a plurality of portions of bow springs. Further, the plurality of sections may each have the same number of bow springs or a different number of bow springs, and the bow springs in each portion may be aligned along a longitudinal axis or offset with respect to the longitudinal axis. While a single section is described below for clarity, it is to be understood that the same concepts may be readily applied by one of ordinary skill in the art to a multi-section design.

Returning to FIG. 2, a plurality of bow springs 206 may connect the collars 202, 204, and optionally one or more interior collars in a multi-section design. The bow springs 206 may be formed from a composite material comprising the same components as the first collar 202 and/or the second collar 204 or different composite materials from the first collar 202 and/or the second collar 204. In an embodiment, one or more of the bow springs may be formed from steel or a similar high strength material. Two or more bow springs 206 may be used to couple the collars 202, 204. The number of bow springs 206 may be chosen based on the wellbore tubular properties (e.g., weight, size), the wellbore properties (e.g., orientation, tortuosity, etc.), the wellbore service conditions (e.g., temperature, acidity, etc.) and/or the annular distance available between the wellbore tubular and the inner wellbore wall. The number of bow springs 206 may also be chosen to reduce the starting and/or drag forces while increasing the restoring force available within the wellbore. The bow springs 206 may generally extend longitudinally between the collars 202, 204. However, additional orientations may be used depending on the desired use of the centralizer. For example, helical and/or angled orientations are also possible. Each of the bow springs 206 may comprise the same materials and orientation. In an embodiment, each bow spring or any combination of the plurality of bow springs may comprise different materials and orientations.

Figure 4A:
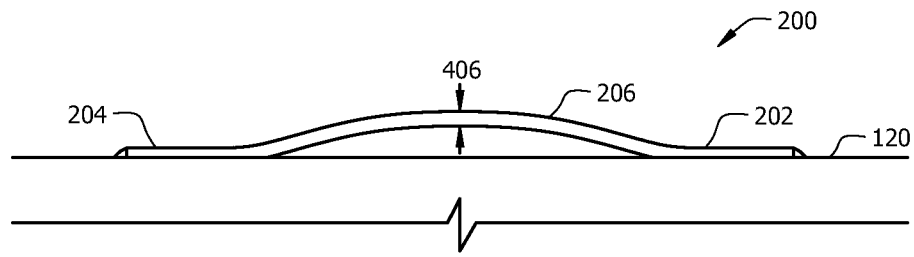
FIGS. 4A, 4B, and 4C are cross-sectional views of centralizers comprising bow springs according to other embodiments.
Figure 4B:
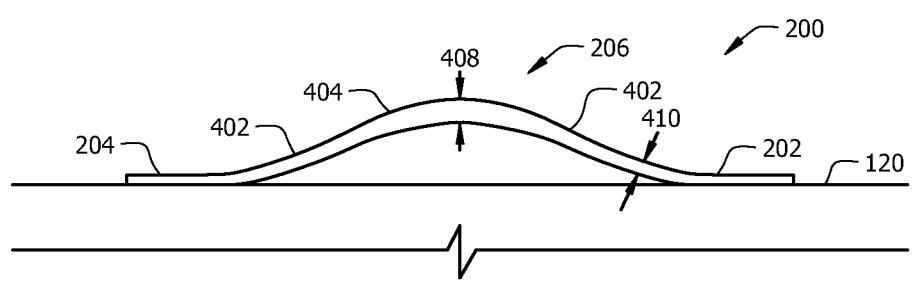
Figure 4C:
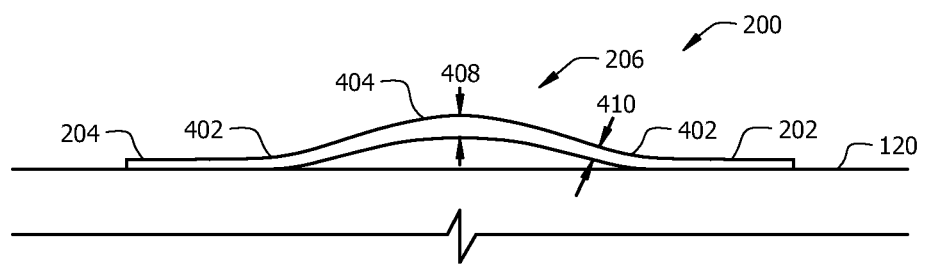

The bow springs 206 may generally have an arced profile between the collars 202, 204, though any suitable shape (e.g., recurved) imparting a standoff from the wellbore tubular and a desired restoring force may be used. In an embodiment shown in FIG. 4A, the bow springs 206 may have a smooth arc between the collars 202, 204. The spring force providing the restoring force may then be described by known spring equations. In an embodiment shown in FIG. 4B and FIG. 4C, the bow springs 206 may have a multi-step design. In this embodiment, the bow springs may general have a first arced section 402 between the collars 202, 204 with a second arced section 404 disposed along the length of the bow spring between the collars 202, 204. The second arced section 404 may be formed in a variety of shapes, (e.g., an arc of increased angle, a sinusoidal curve, etc.). The second arced section 404 may generally have an increased spring constant for imparting an increased restoring force to the bow spring. As a result of the multi-step design, the restoring force may increase in steps as the bow spring 206 is displaced in a radial direction towards the center of the centralizer 200. The initial displacement may occur as a result of the flexing of the larger arced section 402 as shown in FIG. 4C. Additional inward displacement may cause the second arced section 404 to flex and present a greater restoring force. In an embodiment, a plurality of arced sections could be implemented along a bow spring 206 to create a restoring force profile as desired. In an embodiment, each of the bow springs 206 may comprise the same shape. In another embodiment, each bow spring or any combination of the plurality of bow springs may comprise different shapes.

The restoring force may also be tailored based on additional considerations including, but not limited to, the thickness of a bow spring and/or the width of a bow spring. A bow spring may have a uniform thickness along the length of the bow spring, or the thickness may vary along the length of the bow spring. As shown in FIG. 4A, the thickness 406 of the bow spring 206 may be substantially uniform along the length of the bow spring 206. As used herein, "substantially uniform" refers to a thickness that may vary within the manufacturing tolerances of the component. In an embodiment shown in FIG. 4B and FIG. 4C, the thickness 410 of the first arced section 402 may be less than the thickness 408 of the second arced section 404. In general, the restoring force may increase as the thickness of the bow spring increases. Similarly, the restoring force may increase as the width of the bow spring increases. The thickness, width, and length may be limited based upon the characteristics of the wellbore tubular and the wellbore into which the centralizer is disposed. Further design factors that may affect the restoring force, the starting force, and the running force may include, but are not limited to, the type of fiber or fibers used in forming the bow springs, and/or the type of matrix material or materials used to form the bow springs, each of which are discussed in more detail below. Still further design factors may include the angle of winding of the fibers and the thickness of the fibers.

Referring again to FIG. 2, the bow springs may have a plurality of particulates 220 disposed on the outer surface of the bow springs 206. As used herein, the "outer surface" of the bow springs 206 comprises those portions of the bow springs anticipated to contact a surface of a wellbore and/or tubular into which the centralizer is placed. The particulates may be disposed along the entire length of the bow springs or only those portions anticipated to contact the wellbore wall during conveyance of the centralizer and wellbore tubular within the wellbore. As used herein, disposed on the outer surface generally refers to the particulates being located at the outer surface of the bow springs 206 and may include the particulates being embedded in the outer surface, deposited in and/or on the outer surface, and/or coated on the outer surface. The particulates may generally be resistant to erosion and/or abrasion to prevent wear on the points of contact between the bow spring surfaces and the wellbore walls or inner surfaces of the wellbore. The shape, size, and composition of the particulates may be selected to affect the amount of friction between the bow springs and the wellbore walls during conveyance of the wellbore tubular comprising the centralizer within the wellbore. In general, the particulates may be selected to reduce the running forces required during conveyance of the wellbore tubular within the wellbore. In an embodiment, the particulates may comprise a low surface energy and or coefficient of friction, and/or may comprise substantially spherical particles. The particulates may have a distribution of sizes, or they may all be approximately the same size. In an embodiment, the particulates may be within a distribution of sizes ranging from about 0.001 inches to about 0.2 inches, 0.005 inches to about 0.1 inches, 0.01 inches to about 0.005 inches. In an embodiment, the particulates may be about 0.02 inches to about 0.004 inches. The particulates may comprise any material capable of resisting abrasion and erosion when disposed on a bow spring and contacted with the wellbore wall. In an embodiment, the particulates may be formed from metal and/or ceramic. For example, the particulates may comprise zirconium oxide. In an embodiment, the particulates may be coated with any of the surface coating agents discussed below to aid in bonding between the particulates and one or more materials of construction of the centralizer or any centralizer components.

Figure 5:
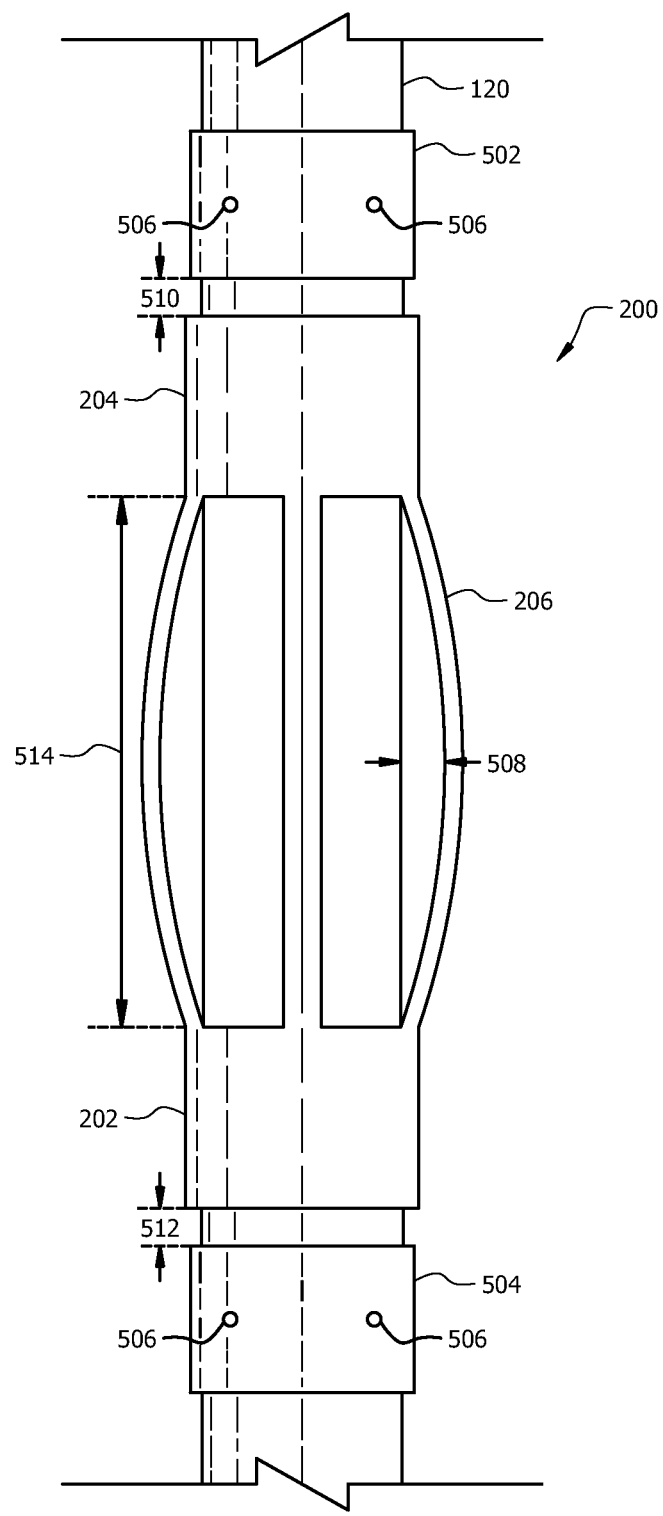
FIG. 5 is a plan view of a centralizer according to yet another embodiment.

The centralizer 200 may be disposed about a wellbore tubular 120 and maintained in place using any technique known in the art. In an embodiment as shown in FIG. 5, stop collars 502, 504 may be used to retain the centralizer 200 on a wellbore tubular 120. The stop collars 502, 504 may be made from steel or similar high strength material. In an embodiment, the stop collars 502, 504 may be constructed from a composite material. The stop collars 502, 504 may be generally cylindrically shaped and may have an internal diameter selected to fit about the exterior of the wellbore tubular 120 to which they are to be affixed. The stop collars 502, 504 may be affixed to the exterior of the wellbore tubular using set screws 506 or any other device known in the art for such purpose. In an embodiment, the stop collars may be constructed of a composite material and may take the form of any of the stop collars shown in U.S. Patent Application Publication Nos. US 2005/0224123 A1, entitled "Integral Centraliser" and published on Oct. 13, 2005, and US 2007/0131414 A1, entitled "Method for Making Centralizers for Centralising a Tight Fitting Casing in a Borehole" and published on Jun. 14, 2007, both of which are incorporated herein by reference in their entirety. The use of stop collars 502, 504 may allow the centralizer 200 to rotate with respect to the wellbore tubular 120 as the centralizer 200 may not be fixedly coupled to the wellbore tubular 120. In an embodiment, a friction device or connector (e.g., a set screw in one or more of the collars 202, 204) may be used to fixedly connect the centralizer 200 to the wellbore tubular 120. In an embodiment, the friction device or connector may be formed from a composite material.

Additional connection methods may be used to couple the centralizer to the wellbore tubular. In an embodiment, a projection may be formed on the wellbore tubular using a composite material that is capable of retaining the centralizer 200 on the wellbore tubular. Suitable projections and methods of making the same are disclosed in U.S. Patent Application Publication No. 2005/0224123 A1 to Baynham et al. and published on Oct. 13, 2005, the entire disclose of which is incorporated herein by reference. The projections may comprise a composite material, which may comprise a ceramic based resin including, but not limited to, the types disclosed in U.S. Patent Application Publication Nos. US 2005/0224123 A1, entitled "Integral Centraliser" and published on Oct. 13, 2005, and US 2007/0131414 A1, entitled "Method for Making Centralizers for Centralising a Tight Fitting Casing in a Borehole" and published on Jun. 14, 2007, both of which were incorporated by reference above. In another embodiment as shown in the centralizer 200 of FIG. 1, at least one window may be disposed in a collar 202, 204, and may be used to couple the centralizer 200 to a wellbore tubular 120. The window disposed in a collar 202, 204 may comprise a cutout of the collar 202, 204 that allows for access through the collar 202, 204. An upset may be created within the window to couple the centralizer 200 to the wellbore tubular 120. Suitable configurations, materials, and methods of coupling the centralizer 200 to the wellbore tubular 120 using a window with an upset disposed therein are disclosed in co-pending U.S. patent application Ser. No. 12/964,605, filed on Dec. 9, 2010, and entitled "Integral Pull-Through Centralizer," the entire disclosure of which is incorporated herein by reference.

Referring to FIG. 5, the stop collars 502, 504 or other means of retaining the centralizer 200 on the wellbore tubular 120 may be sufficiently spaced apart to allow the centralizer 200 to expand longitudinally when radially compressed. The radial, inward compression of the bow springs 206 creates a longitudinal lengthening of the distance 514 between the collars 202, 204, thus increasing the overall length of the centralizer 200. The increase in length of the centralizer 200 is approximately the same as or greater than the radial distance 508 traveled by bow spring 206 during the compression. In order to accommodate this longitudinal travel, the stop collars 502, 504 may be spaced so that the sum of the distances 510 and 512 are equal to or greater than the greatest radial travel distance 508 of the plurality of bow springs 206. In an embodiment, the sum of the distances 510 and 512 may be about 5% to about 10% greater than the distance 508 to allow for operational tolerances during coupling of the centralizer 200 to the wellbore tubular 120 using the stop collars 502, 504.

The centralizer 200 may be formed from one or more composite materials. A composite material comprises a heterogeneous combination of two or more components that differ in form or composition on a macroscopic scale. While the composite material may exhibit characteristics that neither component possesses alone, the components retain their unique physical and chemical identities within the composite. Composite materials may include a reinforcing agent and a matrix material. In a fiber-based composite, fibers may act as the reinforcing agent. The matrix material may act to keep the fibers in a desired location and orientation and also serve as a load-transfer medium between fibers within the composite.

The matrix material may comprise a resin component, which may be used to form a resin matrix. Suitable resin matrix materials that may be used in the composite materials described herein may include, but are not limited to, thermosetting resins including orthophthalic polyesters, isophthalic polyesters, phthalic/maelic type polyesters, vinyl esters, thermosetting epoxies, phenolics, cyanates, bismaleimides, nadic end-capped polyimides (e.g., PMR-15), and any combinations thereof. Additional resin matrix materials may include thermoplastic resins including polysulfones, polyamides, polycarbonates, polyphenylene oxides, polysulfides, polyether ether ketones, polyether sulfones, polyamide-imides, polyetherimides, polyimides, polyarylates, liquid crystalline polyester, polyurethanes, polyureas, and any combinations thereof.

In an embodiment, the matrix material may comprise a two-component resin composition. Suitable two-component resin materials may include a hardenable resin and a hardening agent that, when combined, react to form a cured resin matrix material. Suitable hardenable resins that may be used include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxide resins, and any combinations thereof. Suitable hardening agents that can be used include, but are not limited to, cyclo-aliphatic amines; aromatic amines; aliphatic amines; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; 2-ethyl-4-methyl imidazole; and any combinations thereof. In an embodiment, one or more additional components may be added the matrix material to affect the properties of the matrix material. For example, one or more elastomeric components (e.g., nitrile rubber) may be added to increase the flexibility of the resulting matrix material.

The fibers may lend their characteristic properties, including their strength-related properties, to the composite. Fibers useful in the composite materials used to form a collar and/or one or more bow springs may include, but are not limited to, glass fibers (e.g., e-glass, A-glass, E-CR-glass, C-glass, D-glass, R-glass, and/or S-glass), cellulosic fibers (e.g., viscose rayon, cotton, etc.), carbon fibers, graphite fibers, metal fibers (e.g., steel, aluminum, etc.), ceramic fibers, metallic-ceramic fibers, aramid fibers, and any combinations thereof.

The strength of the interface between the fibers and the matrix material may be modified or enhanced through the use of a surface coating agent. The surface coating agent may provide a physico-chemical link between the fiber and the resin matrix material, and thus may have an impact on the mechanical and chemical properties of the final composite. The surface coating agent may be applied to fibers during their manufacture or any other time prior to the formation of the composite material. Suitable surface coating agents may include, but are not limited to, surfactants, anti-static agents, lubricants, silazane, siloxanes, alkoxysilanes, aminosilanes, silanes, silanols, polyvinyl alcohol, and any combinations thereof.

A centralizer comprising a composite material may be formed using any techniques known for forming a composite material into a desired shape. The fibers used in the process may be supplied in any of a number of available forms. For example, the fibers may be supplied as individual filaments wound on bobbins, yarns comprising a plurality of fibers wound together, tows, rovings, tapes, fabrics, other fiber broadgoods, or any combinations thereof. The fiber may pass through any number rollers, tensioners, or other standard elements to aid in guiding the fiber through the process to a resin bath.

In an embodiment, a fiber may first be delivered to a resin bath. The resin may comprise any of those resins or combination of resins known in the art, including those listed herein. The resin bath can be implemented in a variety of ways. For example, the resin bath may comprise a doctor blade roller bath wherein a polished rotating cylinder that is disposed in the bath picks up resin as it turns. The doctor bar presses against the cylinder to obtain a precise resin film thickness on cylinder and pushes excess resin back into the bath. As the fiber passes over the top of the cylinder and is in contact with the cylinder, the fiber may contact the resin film and wet out. In another embodiment, resin bath may comprise an immersion bath where the fiber is partially or wholly submerged into the resin and then pulled through a set of wipers or roller that remove excess resin.

After leaving the resin bath, the resin-wetted fiber may pass through various rings, eyelets, and/or combs to direct the resin-wetted fiber to a mandrel to form the bow springs. The fibers may be wound onto the mandrel to form the base for the bow springs using an automated process that may allow for control of the direction of the winding and the winding pattern. The winding process may determine the thickness profile of the bow springs in the bow spring formation process. In an embodiment, particulates, which may comprise a surface coating agent, may be disposed on the outer surface of the bow springs after the fibers leave the resin bath and/or when disposed on the mandrel.

The wound fibers may be allowed to harden or set to a desired degree on the mandrel before being cut and removed from the mandrel as a mat. The mat may then be divided into strips of a desired dimension to initially form the bow springs. The strips may be placed in a shaped mold to cure in a desired shape. In an embodiment the mold may comprise a two-piece block mold in which one or more of the strips are placed and formed into a desired shape due to the form of the two piece mold. In an embodiment, the particulates, which may comprise a surface coating agent, may be disposed on the outer surface of the bow springs when the bow springs are placed in the mold. The mold may then be heated to heat cure the resin to a final, cured state. In another embodiment, other curing techniques may be used to cause the strips to harden to a final, cured state. After completing the curing process, the mold may be disassembled and the bow springs removed.

One or more collars may then be prepared according to a similar process. The fiber and/or combination of fibers used to form one or more collars may be passed through a resin bath as described above. The resin-wetted fibers may then be wound onto a cylindrical mandrel of a desired shape, which may be the same or different than the cylindrical mandrel used to form the bow springs. In an embodiment, the cylindrical mandrel upon which the resin-wetted collar fibers are wound may have a diameter approximately the same as the diameter of a wellbore tubular upon which the final centralizer is to be disposed. The fibers may be wound onto the cylindrical mandrel to form a portion of the collars using an automated process that may allow for control of the direction of the winding and the winding pattern. After winding a portion of the resin-wetted collar fibers onto the cylindrical mandrels, the bow springs may be placed onto the cylindrical mandrel in the desired positions. The bow springs may be held in place using temporary restraining means (e.g., tape), or the resin used on the collar fibers may be sufficiently tacky to hold the bow springs in place during the remainder of the manufacturing process.

Additional resin-wetted collar fibers may then be wound onto the cylindrical mandrel, at least a portion of which may be placed on top of the ends of the bow springs. In this manner, the bow springs may be integrally formed into the collars. The fibers may be wound onto the cylindrical mandrel to form the remainder of the collars using an automated process that may allow for control of the direction of the winding and the winding pattern. The formed centralizer may then be cured to produce a final, cured state in the collars and the bow springs. In an embodiment, a heat cycle may be used to thermally cure a thermally curable resin, and/or any other number of curing processes may be used to cure an alternative or additional resin used in the formation of the composite centralizer. The cylindrical mandrel may then be pressed out of the centralizer. In an embodiment, the centralizer may then be disposed about a wellbore tubular and secured in place using any of the methods disclosed above.

The winding process used to form the bow springs and/or the collars may determine the direction of the fibers and the thickness of the bow springs and/or collars. The ability to control the direction and pattern of winding may allow for the properties of the completed centralizer and/or centralizer components to possess direction properties. In an embodiment, the direction of the fibers in the collars may be different than the direction of the fibers in the bow springs. In an embodiment, the fibers in the collars may generally be aligned in a circumferential direction, and the fibers in the bow springs may generally be aligned along the longitudinal axis of the centralizer.

In an embodiment, the centralizer formation process may be designed by and/or controlled by an automated process, which may be implemented as software operating on a processor. The automated process may consider various desired properties of the centralizer as inputs and calculate a design of the centralizer based on the properties of the available materials and the available manufacturing processes. In an embodiment, the automated process may consider various properties of the materials available for use in the construction of the centralizer including, but not limited to, the diameter, stiffness, moduli, and cost of the fibers. The desired properties of the centralizer may comprise the geometry of the centralizer, the restoring force, the running force, the starting force, and any other specific considerations such as a desired choice of materials. The use of the automated process may allow for centralizers to be designed for specific uses and allow the most cost effective design to be chosen at the time of manufacture. Thus, the ability to tailor the design of the centralizer to provide a desired set of properties may offer an advantage of the centralizer and methods disclosed herein.

In an embodiment, a plurality of centralizers may be used with one or more wellbore tubular sections. A wellbore tubular string refers to a plurality of wellbore tubular sections connected together for conveyance within the wellbore. For example, the wellbore tubular string may comprise a casing string conveyed within the wellbore for cementing. The wellbore casing string may pass through the wellbore prior to the first casing string being cemented, or the casing string may pass through one or more casing strings that have been cemented in place within the wellbore. A plurality of centralizers as described herein may be used on the wellbore tubular string to centralize the wellbore tubular string as it is conveyed within the wellbore. The number of centralizers and their respective spacing along a wellbore tubular string may be determined based on a number of considerations including the properties of each centralizer (e.g., the restoring force, the starting force, the running force, etc.), the properties of the wellbore tubular (e.g., the sizing, the weight, etc.), and the properties of the wellbore through which the wellbore tubular is passing (e.g., the annular diameter difference, the tortuosity, the orientation of the wellbore, etc.). In an embodiment, a wellbore design program may be used to determine the number and type of the centralizers based on the various inputs as described herein. The wellbore design program may be coupled with the automated centralizer design process to produce a plurality of centralizers tailored to the conditions that each section of wellbore tubular may encounter in the respective section of the wellbore. The number of centralizers and the spacing of the centralizers along the wellbore tubular may vary along the length of the wellbore tubular based on the expected conditions within the wellbore.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

Reference is further made to the following specific embodiments:

1. A centralizer comprising:
   a first collar;
   a second collar;
   a plurality of bow springs coupling the first collar to the second collar; and
   a plurality of particulates disposed on an outer surface of at least one bow spring;
   wherein one or more of the first collar, the second collar, and the bow springs comprise a composite material.
2. The centralizer of embodiment 1, wherein the leading or trailing edges of the first collar or the second collar are tapered or angled.

3. The centralizer of embodiment 1, wherein the centralizer further comprises a third collar, wherein the plurality of bow springs comprise a first portion of bow springs and a second portion of bow springs, and wherein the first portion of the bow springs couple the first collar to the third collar and the second portion of the bow springs couple the second collar to the third collar.
4. The centralizer of embodiment 1, wherein at least one bow spring has a multi-step design comprising a plurality of arced sections.
5. The centralizer of embodiment 1, wherein the thickness of at least one bow spring varies along the length of the bow spring.
6. The centralizer of embodiment 1, wherein the particulates comprise substantially spherical particles.
7. The centralizer of embodiment 1, wherein the particulates have a size ranging from about 0.001 inches to about 0.2 inches.
8. The centralizer of embodiment 1, wherein the particulates comprise a metal or ceramic.
9. The centralizer of embodiment 1, wherein the particulates comprise zirconium oxide.
10. The centralizer of embodiment 1, wherein the particulates are coated with a surface coating agent.
11. The centralizer of embodiment 1, wherein the composite material comprises a fiber and a matrix material.
12. The centralizer of embodiment 11, wherein the matrix material comprises a resin comprising a hardenable resin and a hardening agent.
13. The centralizer of embodiment 11, wherein the fiber comprise a glass fiber, a cellulosic fiber, a carbon fiber, a graphite fiber, a metal fiber, a ceramic fiber, a metallic-ceramic fiber, an aramid fiber, or any combination thereof.
14. The centralizer of embodiment 11, wherein the fiber is coated with a surface coating agent.
15. A centralizer comprising:
    three or more collars;
    a plurality of bow springs comprising a plurality of portions of bow springs, wherein each portion of bow springs couples two adjacent collars, and wherein one or more of the collars and the bow springs comprise a composite material.
16. The centralizer of embodiment 15, wherein the bow springs in adjacent portions are longitudinally aligned in an offset pattern.
17. The centralizer of embodiment 15, wherein the number of bow springs in a first portion and a second portion are different.
18. The centralizer of embodiment 15, further comprising a plurality of particulates disposed along the outer surface of at least one bow spring.
19. The centralizer of embodiment 15, wherein the composite material comprises a fiber and a matrix material.
20. The centralizer of embodiment 19, wherein the matrix material comprises a resin comprising a hardenable resin and a hardening agent.
21. The centralizer of embodiment 19, wherein the fiber comprise a glass fiber, a cellulosic fiber, a carbon fiber, a graphite fiber, a metal fiber, a ceramic fiber, a metallic-ceramic fiber, an aramid fiber, or any combination thereof.
22. The centralizer of embodiment 15, wherein the fiber is coated with a surface coating agent.
23. A method comprising:
    providing a centralizer disposed about a wellbore tubular, wherein the centralizer comprises:
    a first collar;
    a second collar;
    a plurality of bow springs coupling the first collar to the second collar; and
    a plurality of particulates disposed on an outer surface of at least one bow spring;
    wherein one or more of the first collar, the second collar, and the bow springs comprise a composite material; and
    placing the wellbore tubular in a wellbore disposed in a subterranean formation.
24. The method of embodiment 23, wherein at least one bow spring has a multi-step design comprising a plurality of arced sections.
25. The method of embodiment 23, wherein the particulates comprise substantially spherical particles.
26. The method of embodiment 23, wherein the particulates comprise zirconium oxide.
27. The method of embodiment 23, wherein the particulates are coated with a surface coating agent.
28. The method of embodiment 23, wherein the centralizer is maintained in position on the wellbore tubular using stop collars, protrusions, upsets, or any combination thereof.
29. The method of embodiment 23, wherein the centralizer can rotate about the wellbore tubular.
30. The method of embodiment 23, wherein the composite material comprises a fiber and a matrix material.
31. The method of embodiment 30, wherein the matrix material comprises a resin comprising at least one component selected from the group consisting of: an orthophthalic polyester, an isophthalic polyester, a phthalic/maelic type polyester, a vinyl ester, a thermosetting epoxy, a phenolic, a cyanate, a bismaleimide, a nadic end-capped polyimide, a polysulfone, a polyamide, a polycarbonate, a polyphenylene oxide, a polysulfide, a polyether ether ketone, a polyether sulfone, a polyamide-imide, a polyetherimide, a polyimide, a polyarylate, a liquid crystalline polyester, a polyurethane, a polyurea, and any combinations thereof.
32. The method of embodiment 30, wherein the matrix material comprises a resin comprising a hardenable resin and a hardening agent.
33. The method of embodiment 32, wherein the hardenable resin comprises at least one component selected from the group consisting of: a bisphenol A diglycidyl ether resin, a butoxymethyl butyl glycidyl ether resin, a bisphenol A-epichlorohydrin resin, a bisphenol F resin, a polyepoxide resin, a novolak resin, a polyester resin, a phenol-aldehyde resin, a urea-aldehyde resin, a furan resin, a urethane resin, a glycidyl ether resin, and any combinations thereof.
34. The method of embodiment 32, wherein the hardening agent comprises at least one component selected from the group consisting of: a cyclo-aliphatic amine, an aromatic amine, an aliphatic amine, an imidazole, a pyrazole, a pyrazine, a pyrimidine, a pyridazine, a 1H-indazole, a purine, a phthalazine, a naphthyridine, a quinoxaline, a quinazoline, a phenazine, an imidazolidine, a cinnoline, an imidazoline, a 1,3,5-triazine, a thiazole, a pteridine, an indazole, an amine, a polyamine, an amide, a polyamide, a 2-ethyl-4-methyl imidazole, and any combinations thereof.
35. The method of embodiment 30, wherein the fiber is coated with a surface coating agent, and wherein the surface coating agent comprises at least one compound selected from the group consisting of: a silazane, a siloxane, an alkoxysilane, an aminosilane, a silane, a silanol, a polyvinyl alcohol, and any combination thereof.
36. A method comprising:
    providing a centralizer disposed about a wellbore tubular, wherein the wellbore tubular comprises a stop collar, a protrusion, or an upset on either end of the centralizer, and wherein the centralizer comprises:
   three or more collars;
   a plurality of bow springs comprising a plurality of portions of bow springs, wherein each portion of bow springs couples two adjacent collars, and wherein one or more of the collars and the bow springs comprise a composite material; and
placing the wellbore tubular in a wellbore disposed in a subterranean formation.

37. The method of embodiment 36, wherein the bow springs in at least two adjacent portions are longitudinally aligned in an offset pattern.

38. The method of embodiment 36, further comprising a plurality of particulates disposed along an outer surface of at least one bow spring.

39. The method of embodiment 36, wherein the composite material comprises a fiber and a matrix material.

40. The method of embodiment 39, wherein the matrix material comprises a resin comprising a hardenable resin and a hardening agent.

41. The method of embodiment 39, wherein the fiber is coated with a surface coating agent, and wherein the surface coating agent comprises at least one compound selected from the group consisting of: a silazane, a siloxane, an alkoxysilane, an aminosilane, a silane, a silanol, a polyvinyl alcohol, and any combination thereof.

42. The method of embodiment 23, wherein at least one bow spring has a plurality of particulates disposed on an outer surface and has a multi-step design comprising a plurality of arced sections.

43. A centralizer produced from a process comprising:
   forming a plurality of composite bow spring from a fiber and a resin;
   disposing a plurality of particulates on an outer surface of the composite bow springs;
   curing the composite bow springs in a desired shape to form a plurality of cured bow springs;
   disposing a first portion of a resin-wetted fiber about a cylindrical mandrel to form a plurality of collars;
   disposing the plurality of cured bow springs onto the mandrel with the bow spring ends in contact with the first portion of resin-wetted fiber;
   disposing a second portion of the resin-wetted fiber about the cylindrical mandrel; curing the collars to form a cured centralizer; and
   pressing the mandrel out of the cured centralizer.

44. The centralizer of embodiment 43, wherein the fiber is supplied as a filament, a yarn, a tow, a roving, a tape, a fabric, or any combination thereof.

45. The centralizer of embodiment 43, wherein the fiber in the composite bow spring is aligned in a longitudinal direction.

46. The centralizer of embodiment 43, wherein the fiber in the collars is aligned in a circumferential direction.

47. The centralizer of embodiment 43, wherein the process comprises an automated process.

48. The centralizer of embodiment 47, wherein the automated process considers a diameter of the fiber, a stiffness of the fiber, a moduli of the fiber, a cost of the fiber, or any combination thereof.

What is claimed is:

1. A centralizer comprising:
   a first collar;
   a second collar;
   a plurality of bow springs coupling the first collar to the second collar; and
   a plurality of particulates disposed on an outer surface of at least one bow spring, wherein at least a portion of the plurality of particulates are partially embedded within the outer surface of the at least one bow spring, and wherein the plurality of particulates is configured to reduce the running forces during movement of the centralizer when the plurality of particulates are in contact with a surface;
   wherein one or more of the first collar, the second collar, and the bow springs comprise a composite material.

2. The centralizer of claim 1, wherein the leading or trailing edges of the first collar or the second collar are tapered or angled.

3. The centralizer of claim 1, wherein the centralizer further comprises a third collar, wherein the plurality of bow springs comprise a first portion of bow springs and a second portion of bow springs, and wherein the first portion of the bow springs couple the first collar to the third collar and the second portion of the bow springs couple the second collar to the third collar.

4. The centralizer of claim 1, wherein at least one bow spring has a multi-step design comprising a plurality of arced sections.

5. The centralizer of claim 1, wherein the thickness of at least one bow spring varies along the length of the bow spring.

6. The centralizer of claim 1, wherein the particulates comprise substantially spherical particles.

7. The centralizer of claim 1, wherein the particulates have a size ranging from about 0.001 inches to about 0.2 inches.

8. The centralizer of claim 1, wherein the particulates comprise a metal or ceramic.

9. The centralizer of claim 1, wherein the particulates comprise zirconium oxide.

10. The centralizer of claim 1, wherein the particulates are coated with a surface coating agent.

11. The centralizer of claim 1, wherein the composite material comprises a fiber and a matrix material.

12. The centralizer of claim 11, wherein the fiber comprise a glass fiber, a cellulosic fiber, a carbon fiber, a graphite fiber, a metal fiber, a ceramic fiber, a metallic-ceramic fiber, an aramid fiber, or any combination thereof.

13. The centralizer of claim 11, wherein the fiber is coated with a surface coating agent.

14. The centralizer of claim 1, wherein the particulates have a lower coefficient of friction with the surface than the outer surface of the at least one bow spring with the surface.

15. The centralizer of claim 1, wherein that at least one bow spring comprises the composite material, and wherein at least the portion of the plurality of particulates are partially embedded and cured within the composite material on the outer surface of the at least one bow spring.

16. A centralizer comprising:
   three or more collars;
   a plurality of bow springs comprising a plurality of portions of bow springs, wherein each portion of bow springs couples two adjacent collars, and wherein one or more of the collars and the bow springs comprise a composite material; and wherein at least one bow spring comprises a plurality of arced sections, wherein a thickness of a first arced section of the plurality of arced sections is less than a thickness of a second arced section of the plurality of arced sections; and
   a plurality of particulates disposed along the outer surface of at least one bow spring.

17. The centralizer of claim 16, wherein the bow springs in adjacent portions are longitudinally aligned in an offset pattern.

18. The centralizer of claim 16, wherein the number of bow springs in a first portion and a second portion are different.

19. The centralizer of claim 16, wherein the composite material comprises a fiber and a matrix material.

20. The centralizer of claim 19, wherein the fiber comprise a glass fiber, a cellulosic fiber, a carbon fiber, a graphite fiber, a metal fiber, a ceramic fiber, a metallic-ceramic fiber, an aramid fiber, or any combination thereof.

* * * * *